United States Patent
Mohajer et al.

(10) Patent No.: US 9,507,849 B2
(45) Date of Patent: Nov. 29, 2016

(54) METHOD FOR COMBINING A QUERY AND A COMMUNICATION COMMAND IN A NATURAL LANGUAGE COMPUTER SYSTEM

(71) Applicant: SOUNDHOUND, INC., Santa Clara, CA (US)

(72) Inventors: Keyvan Mohajer, Los Gatos, CA (US); Bernard Mont-Reynaud, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 95 days.

(21) Appl. No.: 14/092,966

(22) Filed: Nov. 28, 2013

(65) Prior Publication Data

US 2015/0149152 A1 May 28, 2015

(51) Int. Cl.
G06F 17/27 (2006.01)
G06F 17/30 (2006.01)

(52) U.S. Cl.
CPC ..... *G06F 17/30637* (2013.01); *G06F 17/2765* (2013.01); *G06F 17/30684* (2013.01)

(58) Field of Classification Search
CPC . G10L 15/1822; G10L 15/18; G10L 15/183; G06F 17/30864; G06F 17/2785; G06F 17/30023; G06F 17/30477; G06F 17/30554; H04L 51/10; H04L 51/18
USPC ........ 704/9, 270.1, 257, 239, 235, 231, 201, 704/2; 715/705, 205, 202; 709/204, 203; 707/770, 722, 706; 705/26.1; 455/457, 455/414.4, 414.1; 379/88.17, 88.01, 379/142.14; 345/173
See application file for complete search history.

(56) References Cited

U.S. PATENT DOCUMENTS 3,919,479 A 11/1975 Moon et al.
4,450,531 A 5/1984 Kenyon et al.
(Continued)

FOREIGN PATENT DOCUMENTS

EP 0944033 A1 9/1999
EP 1367590 A2 12/2003
(Continued)

OTHER PUBLICATIONS

"Grammatical Framework" Version 3.3.3, Copyright Mar. 2012 [retrieved on Sep. 23, 2012], Retrieved from Internet: <http://www.grammaticalframework.org>. 4 pages.
(Continued)

*Primary Examiner* — Michael Colucci
(74) *Attorney, Agent, or Firm* — Haynes Beffel & Wolfeld LLP

(57) ABSTRACT

A method for processing a natural language input to a computerized system. The method parses the input to identify a query portion and a communication portion of the input. The system then determines an answer to the query portion, including identifying communication parameters from the communication portion. Upon determining the answer, the system prepares an answer to the communication and transmits that answer. If the answer requires information from a remote source, the system creates a subsidiary query to obtain that information and then submits the subsidiary query to the remote source. A response to the query is used to compose the answer to the query from the answer to the subsidiary query. If the system concludes that the query portion does not require information from a remote source, analyzing and answering the query locally.

16 Claims, 2 Drawing Sheets

(56) References Cited

U.S. PATENT DOCUMENTS

| | | | |
|---|---|---|---|
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,928,249 A | 5/1990 | Vermesse |
| 4,959,850 A | 9/1990 | Marui |
| 5,019,899 A | 5/1991 | Boles et al. |
| 5,164,915 A | 11/1992 | Blyth |
| 5,436,653 A | 7/1995 | Ellis et al. |
| 5,437,050 A | 7/1995 | Lamb et al. |
| 5,511,000 A | 4/1996 | Kaloi et al. |
| 5,542,138 A | 8/1996 | Williams et al. |
| 5,577,249 A | 11/1996 | Califano |
| 5,581,658 A | 12/1996 | O'Hagan et al. |
| 5,664,270 A | 9/1997 | Bell et al. |
| 5,687,279 A | 11/1997 | Matthews |
| 5,708,477 A | 1/1998 | Forbes et al. |
| 5,799,268 A * | 8/1998 | Boguraev | G06F 17/2775 704/10 |
| 5,862,260 A | 1/1999 | Rhoads |
| 5,874,686 A | 2/1999 | Ghias et al. |
| 5,880,386 A | 3/1999 | Wachi et al. |
| 5,907,815 A | 5/1999 | Grimm et al. |
| 5,918,223 A | 6/1999 | Blum et al. |
| 5,956,683 A | 9/1999 | Jacobs et al. |
| 5,963,957 A | 10/1999 | Hoffberg |
| 5,969,283 A | 10/1999 | Looney et al. |
| 5,974,409 A | 10/1999 | Sanu et al. |
| 5,991,737 A | 11/1999 | Chen |
| 6,049,710 A | 4/2000 | Nilsson |
| 6,067,516 A | 5/2000 | Levay et al. |
| 6,092,039 A | 7/2000 | Zingher |
| 6,108,626 A | 8/2000 | Cellario et al. |
| 6,121,530 A | 9/2000 | Sonoda |
| 6,122,403 A | 9/2000 | Rhoads |
| 6,182,128 B1 | 1/2001 | Kelkar et al. |
| 6,188,985 B1 | 2/2001 | Thrift et al. |
| 6,201,176 B1 | 3/2001 | Yourlo |
| 6,233,682 B1 | 5/2001 | Fritsch |
| 6,292,767 B1 | 9/2001 | Jackson et al. |
| 6,314,577 B1 | 11/2001 | Pocock |
| 6,345,256 B1 | 2/2002 | Milsted et al. |
| 6,363,349 B1 | 3/2002 | Urs et al. |
| 6,385,434 B1 | 5/2002 | Chuprun et al. |
| 6,405,029 B1 | 6/2002 | Nilsson |
| 6,408,272 B1 | 6/2002 | White et al. |
| 6,434,520 B1 | 8/2002 | Kanevsky et al. |
| 6,453,252 B1 | 9/2002 | Laroche |
| 6,504,089 B1 | 1/2003 | Nagasawa et al. |
| 6,505,160 B1 | 1/2003 | Levy et al. |
| 6,507,727 B1 | 1/2003 | Henrick |
| 6,510,325 B1 | 1/2003 | Mack, II et al. |
| 6,519,564 B1 | 2/2003 | Hoffberg et al. |
| 6,532,444 B1 * | 3/2003 | Weber | G06F 17/27 704/257 |
| 6,535,849 B1 | 3/2003 | Pakhomov et al. |
| 6,542,869 B1 | 4/2003 | Foote |
| 6,594,628 B1 | 7/2003 | Jacobs et al. |
| 6,611,607 B1 | 8/2003 | Davis et al. |
| 6,614,914 B1 | 9/2003 | Rhoads et al. |
| 6,629,066 B1 | 9/2003 | Jackson et al. |
| 6,631,346 B1 | 10/2003 | Karaorman et al. |
| 6,633,845 B1 | 10/2003 | Logan et al. |
| 6,633,846 B1 | 10/2003 | Bennett et al. |
| 6,640,306 B1 | 10/2003 | Tone et al. |
| 6,816,578 B1 * | 11/2004 | Kredo | G10L 15/193 379/88.17 |
| 6,834,308 B1 | 12/2004 | Ikezoye et al. |
| 6,850,288 B2 | 2/2005 | Kurokawa |
| 6,879,950 B1 | 4/2005 | Mackie et al. |
| 6,931,451 B1 | 8/2005 | Logan et al. |
| 6,941,275 B1 | 9/2005 | Swierczek |
| 6,967,275 B2 | 11/2005 | Ozick |
| 6,990,453 B2 | 1/2006 | Wang et al. |
| 6,995,309 B2 | 2/2006 | Samadani et al. |
| 7,017,208 B2 | 3/2006 | Weismiller et al. |
| 7,058,376 B2 | 6/2006 | Logan et al. |
| 7,085,716 B1 | 8/2006 | Even et al. |
| 7,174,293 B2 | 2/2007 | Kenyon et al. |
| 7,190,971 B1 | 3/2007 | Kawamoto |
| 7,206,820 B1 | 4/2007 | Rhoads et al. |
| 7,209,892 B1 | 4/2007 | Galuten et al. |
| 7,233,321 B1 | 6/2007 | Larson et al. |
| 7,257,536 B1 | 8/2007 | Finley et al. |
| 7,266,343 B1 | 9/2007 | Yli-juuti et al. |
| 7,323,629 B2 | 1/2008 | Somani et al. |
| 7,328,153 B2 | 2/2008 | Wells et al. |
| 7,373,209 B2 | 5/2008 | Tagawa et al. |
| 7,379,875 B2 | 5/2008 | Burges et al. |
| 7,444,353 B1 | 10/2008 | Chen et al. |
| 7,516,074 B2 | 4/2009 | Bilobrov |
| 7,562,392 B1 | 7/2009 | Rhoads et al. |
| 7,567,899 B2 | 7/2009 | Bogdanov |
| 7,580,832 B2 | 8/2009 | Allamanche et al. |
| 7,627,466 B2 * | 12/2009 | Ramsey | G06F 17/279 704/257 |
| 7,672,916 B2 | 3/2010 | Poliner et al. |
| 7,693,720 B2 | 4/2010 | Kennewick et al. |
| 7,743,092 B2 | 6/2010 | Wood |
| 7,756,874 B2 | 7/2010 | Hoekman et al. |
| 7,783,489 B2 | 8/2010 | Kenyon et al. |
| 7,809,570 B2 * | 10/2010 | Kennewick | G10L 15/22 704/240 |
| 7,853,664 B1 | 12/2010 | Wang et al. |
| 7,858,868 B2 | 12/2010 | Kemp et al. |
| 7,881,657 B2 | 2/2011 | Wang et al. |
| 7,899,818 B2 | 3/2011 | Stonehocker et al. |
| 7,904,297 B2 | 3/2011 | Mirkovic et al. |
| 7,908,135 B2 | 3/2011 | Shishido |
| 8,013,230 B2 | 9/2011 | Eggink |
| 8,073,684 B2 | 12/2011 | Sundareson |
| 8,086,171 B2 | 12/2011 | Wang et al. |
| 8,116,746 B2 | 2/2012 | Lu et al. |
| 8,296,179 B1 | 10/2012 | Rennison |
| 8,358,966 B2 | 1/2013 | Zito et al. |
| 8,370,147 B2 * | 2/2013 | Kennewick | G06Q 30/0261 704/257 |
| 8,606,568 B1 * | 12/2013 | Tickner | G10L 15/1815 704/231 |
| 8,650,210 B1 * | 2/2014 | Cheng | G06F 17/30864 707/707 |
| 8,694,537 B2 | 4/2014 | Mohajer |
| 8,762,156 B2 | 6/2014 | Chen |
| 8,768,687 B1 * | 7/2014 | Quasthoff | G10L 15/26 379/142.14 |
| 8,862,572 B2 * | 10/2014 | Lucovsky | G06F 17/30864 707/722 |
| 9,161,182 B2 * | 10/2015 | Lim | H04W 4/12 |
| 2001/0005823 A1 | 6/2001 | Fischer et al. |
| 2001/0014891 A1 | 8/2001 | Hoffert et al. |
| 2001/0053974 A1 | 12/2001 | Lucke et al. |
| 2002/0023020 A1 | 2/2002 | Kenyon et al. |
| 2002/0042707 A1 | 4/2002 | Zhao et al. |
| 2002/0049037 A1 | 4/2002 | Christensen et al. |
| 2002/0072982 A1 | 6/2002 | Barton et al. |
| 2002/0083060 A1 | 6/2002 | Wang et al. |
| 2002/0116174 A1 * | 8/2002 | Lee | G06F 17/30707 704/9 |
| 2002/0138630 A1 | 9/2002 | Solomon et al. |
| 2002/0174431 A1 | 11/2002 | Bowman et al. |
| 2002/0181671 A1 | 12/2002 | Logan |
| 2002/0193895 A1 | 12/2002 | Qian et al. |
| 2002/0198705 A1 | 12/2002 | Burnett |
| 2002/0198713 A1 | 12/2002 | Franz et al. |
| 2002/0198789 A1 | 12/2002 | Waldman |
| 2003/0023437 A1 | 1/2003 | Fung |
| 2003/0050784 A1 | 3/2003 | Hoffberg et al. |
| 2003/0078928 A1 | 4/2003 | Dorosario et al. |
| 2003/0106413 A1 | 6/2003 | Samadani et al. |
| 2003/0192424 A1 | 10/2003 | Koike |
| 2004/0002858 A1 | 1/2004 | Attias et al. |
| 2004/0019497 A1 | 1/2004 | Volk et al. |
| 2004/0054524 A1 * | 3/2004 | Baruch | G10L 21/00 704/201 |

(56) References Cited

U.S. PATENT DOCUMENTS

| | | |
|---|---|---|
| 2004/0083092 A1* | 4/2004 | Valles ............... G06F 17/2785 704/9 |
| 2004/0167779 A1 | 8/2004 | Lucke et al. |
| 2004/0193420 A1 | 9/2004 | Kennewick et al. |
| 2004/0231498 A1 | 11/2004 | Li et al. |
| 2005/0016360 A1 | 1/2005 | Zhang |
| 2005/0027699 A1 | 2/2005 | Awadallah et al. |
| 2005/0086059 A1 | 4/2005 | Bennett |
| 2005/0201540 A1* | 9/2005 | Rampey ............... H04M 15/06 379/142.14 |
| 2005/0228860 A1* | 10/2005 | Hamynen ......... G06F 17/30241 709/203 |
| 2005/0254366 A1 | 11/2005 | Amar |
| 2005/0273326 A1 | 12/2005 | Padhi et al. |
| 2006/0059225 A1 | 3/2006 | Stonehocker et al. |
| 2006/0122839 A1 | 6/2006 | Li-Chun Wang et al. |
| 2006/0136352 A1* | 6/2006 | Brun ................. G06F 17/2755 |
| 2006/0155694 A1 | 7/2006 | Chowdhury et al. |
| 2006/0169126 A1 | 8/2006 | Ishiwata et al. |
| 2006/0189298 A1 | 8/2006 | Marcelli |
| 2006/0242017 A1 | 10/2006 | Libes et al. |
| 2006/0277052 A1 | 12/2006 | He et al. |
| 2007/0010195 A1 | 1/2007 | Brown et al. |
| 2007/0016404 A1 | 1/2007 | Kim et al. |
| 2007/0055500 A1 | 3/2007 | Bilobrov |
| 2007/0120689 A1 | 5/2007 | Zerhusen et al. |
| 2007/0168409 A1 | 7/2007 | Cheung |
| 2007/0168413 A1 | 7/2007 | Barletta et al. |
| 2007/0204211 A1* | 8/2007 | Paxson ............... G06F 17/2229 715/205 |
| 2007/0204319 A1 | 8/2007 | Ahmad et al. |
| 2007/0239676 A1 | 10/2007 | Stonehocker et al. |
| 2007/0260634 A1 | 11/2007 | Makela et al. |
| 2007/0288444 A1 | 12/2007 | Nelken et al. |
| 2008/0022844 A1 | 1/2008 | Poliner et al. |
| 2008/0026355 A1 | 1/2008 | Petef |
| 2008/0082510 A1 | 4/2008 | Wang et al. |
| 2008/0134264 A1 | 6/2008 | Narendra et al. |
| 2008/0154951 A1 | 6/2008 | Martinez et al. |
| 2008/0215319 A1 | 9/2008 | Lu et al. |
| 2008/0235872 A1 | 10/2008 | Newkirk et al. |
| 2008/0249982 A1 | 10/2008 | Lakowske |
| 2008/0255937 A1 | 10/2008 | Chang et al. |
| 2008/0256115 A1 | 10/2008 | Beletski et al. |
| 2009/0030686 A1 | 1/2009 | Weng et al. |
| 2009/0031882 A1 | 2/2009 | Kemp et al. |
| 2009/0063147 A1 | 3/2009 | Roy |
| 2009/0064029 A1 | 3/2009 | Corkran et al. |
| 2009/0113279 A1* | 4/2009 | Monro ............... G11B 27/034 715/202 |
| 2009/0119097 A1 | 5/2009 | Master et al. |
| 2009/0125298 A1 | 5/2009 | Master et al. |
| 2009/0125301 A1 | 5/2009 | Master et al. |
| 2009/0228799 A1 | 9/2009 | Verbeeck et al. |
| 2009/0240488 A1 | 9/2009 | White et al. |
| 2010/0014828 A1 | 1/2010 | Sandstrom et al. |
| 2010/0049514 A1 | 2/2010 | Kennewick et al. |
| 2010/0138402 A1* | 6/2010 | Burroughs ........ G06F 17/30684 707/706 |
| 2010/0158488 A1 | 6/2010 | Roberts et al. |
| 2010/0205166 A1 | 8/2010 | Boulter et al. |
| 2010/0211693 A1 | 8/2010 | Master et al. |
| 2010/0216492 A1* | 8/2010 | Steinmetz ............... H04L 51/20 455/457 |
| 2010/0235341 A1 | 9/2010 | Bennett |
| 2010/0241418 A1 | 9/2010 | Maeda et al. |
| 2010/0250497 A1 | 9/2010 | Redlich et al. |
| 2011/0010352 A1* | 1/2011 | Jockisch ........... G06F 17/30864 707/706 |
| 2011/0046951 A1 | 2/2011 | Suendermann et al. |
| 2011/0060587 A1* | 3/2011 | Phillips ................ G10L 15/30 704/235 |
| 2011/0071819 A1 | 3/2011 | Miller et al. |
| 2011/0082688 A1 | 4/2011 | Kim et al. |
| 2011/0112921 A1* | 5/2011 | Kennewick ........ G06Q 30/0601 705/26.1 |
| 2011/0132173 A1 | 6/2011 | Shishido |
| 2011/0132174 A1 | 6/2011 | Shishido |
| 2011/0173208 A1 | 7/2011 | Vogel |
| 2011/0213475 A1 | 9/2011 | Herberger et al. |
| 2011/0213657 A1* | 9/2011 | O'Malley .......... G06Q 30/0251 705/14.49 |
| 2011/0244784 A1 | 10/2011 | Wang |
| 2011/0276334 A1 | 11/2011 | Wang et al. |
| 2011/0288855 A1 | 11/2011 | Roy |
| 2011/0307779 A1* | 12/2011 | Scholler ............... G06F 21/6218 715/705 |
| 2012/0029670 A1 | 2/2012 | Mont-Reynaud et al. |
| 2012/0096089 A1* | 4/2012 | Barash ............... G06F 19/3425 709/204 |
| 2012/0191453 A1* | 7/2012 | Roberge ................. G10L 15/08 704/239 |
| 2012/0232683 A1 | 9/2012 | Master et al. |
| 2012/0265528 A1* | 10/2012 | Gruber .................... G10L 15/18 704/235 |
| 2013/0052939 A1 | 2/2013 | Anniballi et al. |
| 2013/0165086 A1* | 6/2013 | Doulton ............... G06Q 10/107 455/414.4 |
| 2013/0185336 A1* | 7/2013 | Singh ................ G06F 17/30654 707/794 |
| 2013/0195258 A1* | 8/2013 | Atef ....................... H04L 67/34 379/88.01 |
| 2014/0019483 A1 | 1/2014 | Mohajer |
| 2014/0057610 A1* | 2/2014 | Olincy ............. H04M 3/42365 455/414.1 |
| 2014/0081633 A1* | 3/2014 | Badaskar .......... G06F 17/30023 704/235 |
| 2014/0292669 A1* | 10/2014 | Locker ................... H04L 63/18 345/173 |
| 2014/0316785 A1 | 10/2014 | Bennett et al. |
| 2015/0019228 A1* | 1/2015 | Akolkar ............ G06F 17/30684 704/270.1 |

FOREIGN PATENT DOCUMENTS

| | | |
|---|---|---|
| JP | H11-272274 A | 10/1999 |
| JP | 2000187671 A | 7/2000 |
| WO | 9517746 A1 | 6/1995 |
| WO | 99/18518 A2 | 4/1999 |
| WO | 03061285 A2 | 7/2003 |
| WO | 2004091307 A2 | 10/2004 |
| WO | 2008004181 A2 | 1/2008 |
| WO | 2010018586 A2 | 2/2010 |
| WO | 2013177213 A2 | 11/2013 |

OTHER PUBLICATIONS

VoiceXML Tutorial (NUANCE), BeVocal, Inc., Mountain View, CA, Copyright 2005, 68 pages.

JavaScript Quick Reference, BeVocal Inc. (NUANCE), Mountain View, CA, Copyright 2005, 24 pages.

Grammar Reference, BeVocal, Inc. (NUANCE), Mountain View, CA, Copyright 2005, 102 pages.

Ranta, Aarne, "Creating Linguistic Resources with the Grammatical Framework", LREC Tutorial, Malta, May 17, 2010, 75 pages.

Conway, D., et al., "Synopsis 5: Regexes and Rules", Version 158, Created Jun. 24, 2002 and Last Modified Jul. 31, 2012 [retrieved Sep. 26, 2012], Retrieved from Internet: <http://pericabal.org/syn/s05.html>, 65 pages.

Grammar's Developers Guide, Nuance Speech Recognition System, Version 8.5, Copyright 2003 Nuance Communications Inc., Menlo Park, CA, 262 pages.

Wang, Avery Li-Chun, Industrial-Strength Audio Search Algorithm, In ISMIR 2003, 4th Symposium Conference on Music Information Retrieval(Oct. 26, 2003), pp. 7-13.

Venkatachalam, V., Cazzanti, L., Chillon, N., Wells, M., "Automatic Identification of Sound Recordings," Signal Processing Magazine, IEEE, Mar. 2004, 92-99, vol. 21, Issue 2.

Nelson, Jeffrey, V., "Cast Song ID from Verizon Wireless," May 21, 2007 [retrieved on Jul. 24, 2014], Retrieved from Internet: <http://

(56) References Cited

OTHER PUBLICATIONS www.verizonwireless.com/news/article/2007/05/pr2007-05-21a. html>.
Gracenote: MusicID, available at http://www.gracenote.com/business.sub.--solutions/music.sub.--id/, last accessed Aug. 4, 2010.
Shazam: http://web.archive.org/web/20100501190631/http://www.shazam.com/. Last accessed May 1, 2010.
App Shopper Shazam: http://appshopper.com/music/shazam. Last changed Jul. 24, 2014.
Gracenote Mobile MusicID: http://web.archive.org/web/20100123211802/http://www.gracenote.com/busine-ss.sub.--solutions/mobileMusic/. Last accessed Jan. 23, 2010.
App Shopper MusicID: http://appshopper.com/music/musicid. Last changed Jul. 14, 2014.
Xu, et al. "Music Identification Via Vocabulary Tree with MFCC Peaks," MIRUM '11 Proceedings of the 1st international ACM workshop on Music information retrieval with user-centered and multimodal strategies, 2011. p. 21-26.http://dl.acm.org/citation.cfm?doid=2072529.2072537.
Li, et al. "Robust Audio Identification for MP3 Popular Music," SIGIR '10 Proceedings of the 33rd international ACM SIGIR conference on Research and development in information retrieval, Jul. 2010. p. 627-634.http://dl.acm.org/citation.cfm?doid=1835449.1835554.
Yu, et al. "A Query-By-Singing System for Retrieving Karaoke Music," IEEE Transactions on Multimedia, Dec. 2008, vol. 10, No. 8, p. 1626-1637. http://ieeexploreieee.org/xpl/articleDetails.jsp?arnumber=4694852.
Casey, et al. "Content-Based Music Information Retrieval: Current Directions and Future Challenges," Proceedings of the IEEE, 2008. vol. 96, No. 4, p. 668-696. http://research.yahoo.com/pub/2649.
Liu, et al. "Content-Based Retrieval of MP3 Music Objects," CIKM '01 Proceedings of the tenth international conference on Information and knowledge management, 2001. p. 506-511. http://dx.doi.org/10.1145/502585.502670.
OMRAS2—Ontology-Driven Music Retrieval & Annotation Sharing Service. Overview—Apr. 24, 2009 [Accessed Jul. 24, 2014—Archive.org] http://web.archive.org/web/20090424083019/http://www.omras2.org/overview. 2 pages.
OMRAS2—AudioDB—Populating and Querying an AudioDB Instance. (No archived version available—accessed Jul. 24, 2014 via Google) http://omras2.org/audioDB/tutorial1. 3 pages.
Matsubara, S, et al., "Chart-based Parsing and Transfer in Incremental Spoken Language Translation", Proceedings of the Fourth Natural Language Processing Pacific Rim Symposium, 1997, 4 pgs.
Benson, et al. "Sync Kit: A Persistent Client-Side Database Caching Toolkit for Data Intensive Websites," Proceedings Of The 19th International Conference On World Wide Web, Apr. 2010. pp. 121-130. http://dl.acm.org/citation.cfm?id=1772704.
Larson, et al. "NYT to Release Thesaurus and Enter Linked Data Cloud," NY Times Blogs, Jun. 2009. http://open.blogs.nytimes.com/2009/06/26/nyt-to-release-thesaurus-and-ent-erlinked-datacloud/.
"Aurix Enhances Effectiveness Of Leading Search Software," Aurix.com—News. Jun. 1, 2010. http://www.aurix.com/pages/3808/Aurix.sub.--enhances.sub.--effectiveness.- sub.--of .sub.--leading.sub.--search.sub.--software.htm.
Jamil, "A Natural Language Interface Plug-In For Cooperative Query Answering In Biological Databases," BMC Genomics, Nov. 2011. (Accessed Sep. 27, 2012 via SpringerLink) http://www.biomedcentral.com/1471-2164/131S3/S4.
Feng, "A General Framework for Building Natural Language Understanding Modules in Voice Search," 2010 IEEE International Conference on Acoustics Speech and Signal Processing (ICASSP), Mar. 2010. (Accessed Jul. 24, 2014—IEEE)http://ieeexplore.ieee.org/xpl/articleDetails.jsp?arnumber=5494951.
Langanke, "Direct Voice Control Speech Data Entry and Database Query Models," International Symposium on Logistics and Industrial Informatics, Sep. 2007. (Accessed Jul. 24, 2014—IEEE)http://ieeexplore.ieee.org/xpl/articleDetails.jsp?arnumber=4343522.
Indukuri, et al. "Natural Language Querying Over Databases Using Cascaded CRFs," Lecture Notes in Computer Science, Sep. 2010, http://www.springerlink.com/content/5w1x27650475304m.
Kolias, et al. "Design and implementation of a VoiceXML-driven wiki application for assistive environments on the web," Personal and Ubiquitous Computing, Sep. 2010. vol. 14, No. 6, p. 527-539,http://www.icsd.aegean.gr/publication.sub.--files/journal/295233664.pdf.
PCT/US13/42097—International Search Report & Written Opinion dated Dec. 2, 2013, filed May 21, 2013.
ATT, "Conversant VIS Version 4.0 Whole Word Bilignual Speech Recognition", Issue 1, Oct. 1993, 86 pgs.
"Contact Center Business Planning Guide", Avaya Inc., 2010, 8 pgs.
Mohri, M, et al., "Weighted Finite-State Transducers in Speech Recognition", Computer Speech and Language, Jan. 2002, 26 pgs.
"Avaya Self-Service Optimization. Optimize the Performace of your Avaya Self-Service applications", Avaya, Inc., 2011, 4 pgs.
"VoiceXML Tutorial. Developer documentation", Bevocal, Inc., 2005, 68 pgs.
Brick, T, et al. "Incremental Natural Language Parsing for HRI", Journal of the Association for Computing Machinery, Mar. 10-12, 2007, 8 pgs.
Charniak, E, Goldwater, et al. "Edge-Based Best-First Chart Parsing", 1998, 8 pgs.
Crisostomo, A. "Constituents and Phrases", Jul. 2011, 43 pgs.
Copestake, A, et al., "Minimal Recursion Semantics: An Introduction" Research on Language and Computation, vol. 3, pp. 281-332, 2005.
Deobhakta, N., "Natural Language Processing, User Interfaces, and the Semantic Web". Proceedings from the Third Annual HCI Symposium, Dec. 2012, 22 pgs.
"ECMAScript Language Specification", ECMA-262, ECMA International, 5.1 Edition, Jun. 2011, 258 pgs.
Graham, P., "Parsing with ATNs", Engelwood Cliffs, NJ, Prentice Hall, 1993, 16 pgs.
McKeown, K., "Semantic Analysis: Syntax-Driven Semantics", 27 pgs. [retrieved Jun. 17, 2014]. Retrieved from the Internet: <URL: <http://www.google.com/url?sa=t&rct=j&q=&esrc=s&source=web&cd=2&ved=0CCEQFjAB&url=http%3A%2F%2Fwww1.cs.columbia.edu%2F~kathy%2FNLP%2FClassSlides%2FClass13 SemanticAnalysis%2Fsemantics.ppt&ei=Xdb4VMPDIcvso AS2soGABg&usg=AFQjCNGiXuBWLO-oQB_MLor_kN_ 8ATdpRg&sig2=BnvJvvJJo3OApAC6ny0guQ&bvnn=bv. 87611401,d.cGU>>.
Huang, L, et al., "Dynamic Programming for Linear-Time Incremental Parsing". Proceedings of the 48th Annual Meeting of the Association for Computational Linguistics, pp. 1077-86, Jul. 2010.
Iqbal, R, et al., "A Negation Query Engine for Complex Query Transformations". Journal of Science and Technology, pp. 193-204, 2013.
Klein, D, et al. "Accurate Unlexicalized Parsing", Proceedings of the 41st Meeting of the Association for Computational Linguistics, vol. 1, pp. 423-430, 2003.
Murase, T, et al., "Incremental CFG Parsing with Statistical Lexical Dependencies", Proceedings of the Sixth Natural Language Processing Pacific Rim Symposium, Nov. 2001, 9 pgs.
New, B., "Question Answering at TREC", Pre-Internship report, Mar. 2000. 4 pgs.
Nortel Norstar, "Voice Mail Speech Recognition Automated Attendant", Product manual [online]. 29 pgs. Nortel Norstar [retrieved Sep. 4, 2012]. Retrieved from the Internet: <URL: https://downloads.avaya.com/css/P8/documents/100141923>.
Norvell, T., "A Short Introduction to Regular Expressions and Context Free Grammars", Project report, Nov. 2002, 5 pgs.
Quesada, J, et al. "Design of a Natural Language Command Dialogue System". Project deliverable 3.2, SIRIDUS, 2000, 91 pgs.
Seneff, S., "TINA: A Natural Language System for Spoken Language Applications", Journal of the Association for Computational Linguistics, 18 (1), pp. 61-82, Mar. 1992.
Seneff, S, et al., "Galaxy-II: A Reference Architecture for Conversational System Development", Proceedings of the International Conference on Spoken Language Processing, Nov. 1998, 5 pgs.

(56) References Cited

OTHER PUBLICATIONS

Stolcke, A., "An Efficient Probabilistic Context-Free Parsing Algorithm that Computes Prefix Probabilities", Journal of the Association for Computational Linguistics, 21 (2), Jun. 1995, pp. 165-201.
"Do you know the true cost of IVR migration?" Datasheet. Aspect Software Incorporated, Dec. 2012, 4 pgs.
Zlatanov, T. "Cultured Perl", Nov. 2004, 13 pgs. [retrieved Oct. 22, 2014]. Retrieved from the Internet: <URL: http://www.ibm.com/developerworks/linux/library/l-cpregex/index.html>.
Younger, Daniel H., "Recognition and parsing of context-free languages in time n3", Information and Control, vol. 10, Issue 2, Feb. 1967, pp. 189-208.
Guzzino, Didier, "Active: A Unified Platform for Building Intelligent Applications", Jan. 23, 2008, 263 pgs.
"Nuance Recognizer 9.0: Language Pack Guide", Nuance Communications, Inc., 2007, 34 pgs.
U.S. Appl. No. 13/842,735—Office Action dated Feb. 20, 2015, 12 pages.
U.S. Appl. No. 13/480,400—Notice of Allowance dated Aug. 15, 2013, 9 pages.
U.S. Appl. No. 13/480,400—Notice of Allowance dated Nov. 7, 2013, 10 pages.
U.S. Appl. No. 13/480,400—Office Action dated May 7, 2013, 15 pages.
U.S. Appl. No. 13/480,400—Reponse to Office Action dated May 7, 2013, filed Jul. 8, 2013, 13 pages.
U.S. Appl. No. 13/849,290—Notice of Allowance dated Jan. 23, 2015, 8 pages.
U.S. Appl. No. 13/844,028—Office Action dated Nov. 7, 2015, 14 pages.
U.S. Appl. No. 13/401,728—Notice of Allowance dated Mar. 4, 2015, 8 pages.
U.S. Appl. No. 13/401,728—Office Action dated Jul. 17, 2014, 11 pages.
U.S. Appl. No. 13/401,728—Reponse to Office Action dated Jul. 17, 2014, filed Oct. 16, 2014, 16 pages.
U.S. Appl. No. 13/193,514—Office Action dated Jul. 17, 2015, 15 pages.
U.S. Appl. No. 13/193,514—Office Action dated Aug. 22, 2015, 20 pages.
U.S. Appl. No. 13/193,514—Office Action dated Jan. 6, 2014, 20 pages.
U.S. Appl. No. 13/193,514—Response to Office Action dated Jan. 6, 2014, filed May 6, 2015, 11 pages.
U.S. Appl. No. 13/193,514—Respone to Office Action dated Aug. 22, 2014, filed Jan. 8, 2015, 7 pages.
U.S. Appl. No. 13/193,514—Response to Office Action dated Aug. 22, filed Dec. 22, 2014, 9 pages.
U.S. Appl. No. 13/842,735—Response to Office Action dated Feb. 20, 2015, filed Aug. 19, 2015, 15 pages.
PCT/20091066458, International Search Report, mailed Jun. 23, 2010, 16 pages.
InData Corporation, DepoView Video Review Software Product Description, "InData's Newest Video Deposition Viewer", Dec. 2007, 2 pgs.
InData Corporation, DepoView DVD, Video Review Software Product Brochure, Jun. 2008, 4 Pgs.
InData Corporation, DepoView Video Review Software Product Description, http://indatacorp.com/depoview.html, accessed Nov. 8, 2011, 2 Pgs.
Sony Ericsson's W850i Walkman Phone Now Available in the Middle East. Al-Bawaba News, 2006 Al-Bawaba. Dec. 11, 2006. Factiva, Inc. <www.albawaba.com>. 2 pages.
Blackburn, Steven G. "Content Based Retrieval and Navigation of Music". University of Southampton, Departmenf of Electronics and Computer Science, Faculty of Engineering and Applied Science. Mar. 10, 1999. 41 Pages.
Blackburn, Steven, et al. "A Tool for Content Based Navigation of Music". University of Southampton, Department of Electronics and Computer Science, Multimedia Research Group. Copyright 1998 ACM 1-58113-036-8198/0008. pp. 361-368.
Blackburn, Steven George. "Content Based Retrieval and Navigation of Music Using Melodic Pitch Contours". University of Southampton, Department of Electronics and Computer Science, Faculty of Engineering and Applied Science. Sep. 26, 2000. 136 Pages.
Blackburn, Steven G. "Search by Humming". University of Southampton, Department of Electronics and Computer Science, Faculty of Engineering. May 8, 1997. 69 Pages.
Hum That Tune, Then Find it on the Web. NPR: Weekend Edition—Saturday, WKSA. Copyright 2006 National Public Radio. Dec. 23, 2006. Factiva, Inc. 2 pages.
Casey, Michael A., et al., "Content-Based Music Information Retrieval: Current Directions and Future Challenges". Apr. 2008, vol. 96, No. 4. Copyright 2008 IEEE. Retrieved from IEEE Xplore [retrieved on Dec. 29, 2008 at 18:02]. 29 Pages.
Wagstaff, Jeremy. "Loose Wire: New Service Identifies Songs You Hum". WSJA Weekend Journal. Copyright 2006, Dow Jones & Company, Inc. Dec. 25, 2006. Factiva, Inc. 2 pages.
Saltzman, Marc. "The Best Things in life are Free—For Your iPhone". Home Electronics and Teechnology, For Canwest News Service. Copyright 2008 Edmonton Journal. Nov. 12, 2008. Factiva, Inc. 2 pages.
First Products with Gracenote Technology to Ship in 2008. Warren's Consumer Electronics Daily. Copyright 2007 Warren Publishing, Inc. Sep. 18, 2007. Factiva, Inc. 2 pages.
Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.
Furui, Sadaoki. "Digital Speech Processing, Synthesis, and Recognition". Second Edition, Revised and Expanded. Nov. 17, 2000. ISBN 978-0824704520. 17 pages.
Ghias, Asif, et al. "Query By Humming". Musical Information Retrieval in an Audio Database. Cornell University 1995. 6 Pages.
Ghias, Asif, et al. "Query by Humming—Musical Information Retrieval in an Audio Database". ACM Multimedia 95—Electronic Proceedings. San Francisco, CA. Nov. 5-9, 1995. 13 Pages.
Han, Byeong-jun, et al. "M-Musics: Mobile Content-Based Music Retrieval System". Copyright 2007, Augsburg, Bavaria, Germany. ACM 978-1-59593-01-8/07/0009. Sep. 23-27, 2007. pp. 469-470. 2 Pages.
Jang, Jyh-Shing Roger, et al. "A General Framework of Progressive Filtering and its Application to Query to Singing/Humming". IEEE Transactions on Audio, Speech, and Language Processing, vol. 16. No. 2, Feb. 2008. pp. 350-358. 9 Pages.
Kosugi, Naoko, et al. "A Practical Query-By-Humming System for a Large Music Database". NTT Laboratories, Japan. ACM Multimedia Los Angeles, Ca, USA. Copyright ACM 2000 1-58113-198-4/00/10. pp. 333-342. 10 Pages.
McNab, Rodger J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. p 11-18. 8 Pages.
McNab, Rodger J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873. Retrieved from the Internet: <http://dlib.org/dlib/may97/meldex/05written.html>, 13 pages.
Pardo, Bryan, et al. "The VocalSearch Music Search Engine". EECS, Northwestern University. JCDL 2008, Pittsburgh, Pennsylvania, USA. Jun. 16-20, 2008, ACM 978-1-59593-998-2/08/06. p. 430. 1 Page.
Mobile Music: Comcast Cellular First in U.S. to Trial Breakthrough Interactive Music Service Called *CD. Copyright PR Newswire, New York. ProQuest LLC. Feb. 11, 1999. Retrieved from the Internet: <http://proquest.umi.com.libproxy.mit.edu/pqdwb?did+38884944&sid=3&Fmt=3&clientId=5482&RQT=309&VName=PQD>. 3 pages.
Song, Jungmin, et al. "Query by Humming: Matching Humming Query to Polyphonic Audio". LG Electronics, Seoul, Korea. Copyright 2002 IEEE. 0/7809-7304-9/02. pp. 329-332. 4 Pages.

(56) References Cited

OTHER PUBLICATIONS

Taylor, Chuck. "Company Lets Listeners Dial for CDs". Billboard, vol. 1, No. 26, General Interest Module. Jun. 26, 1999. pp 86-87. 2 pages.

Can't Get That Song Out of Your Head. Copyright 2007 The Jakarta Post. May 20, 2007. Factiva, Inc. 2 Pages.

Typke, Rainer, et al. "A Survey of Music Information Retrieval Systems". Universiteit Utrecht, The Netherlands. Copyright 2005 Queen Mary, University of London. 8 Pages.

Wang, Avery. "The Shazam Music Recognition Service". Communications of the ACM, vol. 49, No. 8. Aug. 2006. ACM 0001-0782106/0800. pp. 44-48. 5 pages.

Melodis Rolls Out midomi mobile. Wireless News. Copyright 2008 M2 Communications, Ltd. Mar. 6, 2008. 1 Page.

Zhu, Yunyue, et al. "Warping Indexes with Envelope Transforms for Query by Humming". New York University, New York. SIGMOD Copyright 2003, San Diego, CA. Jun. 9-12, 2003. ACM 1-58113-634-X/03/06. pp. 181-192. 12 Pages.

PCT/US2009/066458, International Preliminary Report on Patentability dated Jun. 7, 2011, 7 pages.

Wang et al., "Method and Apparatus for Recognizing Sound and Music Signals in High Noise and Distortion", U.S. Appl. No. 60/222,023, dated Jul. 31, 2000, 26 pages.

Rhoads, G., "Methods and Systems Employing Digital Watermarking", U.S. Appl. No. 60/134,782, dated May 19, 1999, 47 pages.

Finley, Michael, et al., "Broadcast Media Purchasing System", U.S. Appl. No. 60/166,965, dated Nov. 23, 1999, 21 pages.

Swierczek, Remi, "Music Identification System", U.S. Appl. No. 60/158,087 dated Oct. 7, 1999, 12 pages.

Swierczek, Remi, "Music Identification System", U.S. Appl. No. 60/186,565, dated Mar. 2, 2000, 14 pages.

Chou, Ta-Chun, et al., "Music Databases: Indexing Techniques and Implementation", Proceedings of International Workshop on Multimedia Database Management Systems, IEEE, dated Aug. 14-16, 1996, pp. 46-53, 8 pages.

McPherson, John R. and Bainbridge, David, "Usage of the MELDEX Digital Music Library", 1999, in Proceedings of the International Symposium on Music Information Retrieval, (Bloomington, IN, USA, 2001), pp. 19-20, 2 pages.

Wold, Erling, et al., "Classification, Search, and Retrieval of Audio", Muslce Fish, Berkeley, CA, USA, CRC Handbook of Multimedia Computing 1999, pp. 1-19, 18 pages.

Wold et al., "Content-Based Classification, Search and Retrieval of Audio", IEEE Multimedia 1070-986X/96, vol. 3, No. 3: Fall 1996, pp. 27-36 (17 pages).

Horn, Patricia, "What was that song? With a wireless phone, find out what you heard on the radio.", The Inquirer, Philadelphia, Pennsylvania, USA, dated Feb. 11, 1999, 3 pages.

Kenyon, Stephen, et al., U.S. Appl. No. 60/218,824 for Audio Identification System and Method, field Jul. 18 2000, 45 pages.

Kenyon, Stephen, U.S. Appl. No. 60/155,064 for Automatic Program Identification System and Method, filed Sep. 21, 1999, 49 pages.

U.S. Appl. No. 13/401,728—Response to Office Action dated Jul. 17, 2014, filed Oct. 16, 2014, 16 pages.

Ranta, Aarne, "Grammatical Framework: Programming with Multilingual Grammars", Slides for the GF book, CSLI Stanford, Copyright 2011, 440 pages.

Ranta, Aarne. "Grammatical Framework Tutorial", Copyright Dec. 2010 for GF 3.2 [retrieved on Sep. 13, 2012], Retrieved from Internet: <http://www.grammaticalframework.org/doc/tutorial/gf-tutorial.html>. 68 pages.

\* cited by examiner

METHOD FOR COMBINING A QUERY AND A COMMUNICATION COMMAND IN A NATURAL LANGUAGE COMPUTER SYSTEM

TECHNICAL FIELD

Broadly, the presently disclosed embodiments relate to speech recognition systems, and more particularly to speech recognition systems capable of analyzing and processing natural language inputs.

BACKGROUND

It is axiomatic that computers do what one commands them to do, not what one wants them to do. In the early days of computer science, programmers were required to expressly command every change of state that occurred during execution of the program, in language directly understandable by the machine. In those days, interactive user interfaces did not exist; users simply provided data for processing and received results. The development of high-level programming, in which commands were expressed in more or less descriptive terms, proceeded in parallel with the introduction of interactive systems where users communicated with the computer during operation of the program.

At first, user interaction was highly constrained. Uses were allowed to choose among varieties of options, but the system presented the allowable choices. Introduction of intuitive user input devices, such as the mouse and the touchpad provided greater user flexibility, but the user was still limited to inputs that the computer could easily recognize.

Speech recognition systems offer the possibility of free-form user interaction with a computer system, but the complexity of human language has proved a formidable obstacle to the implementation of true natural language commands. The common experience of attempting to deal with speech recognition systems used by various dial-up customer service operations easily demonstrates the distance yet to be traversed before achieving true natural language control of computer systems. Existing technology available to the art can provide systems capable of accepting a number of vocal commands from a user, but those commands must be carefully defined, and for optimum success, training may be required before a computer system can consistently recognize commands.

Ordinary natural language often makes use of compound thoughts and commands. Among the aspects of human speech that present major obstacles to computers is the tendency to combine thoughts and ideas in ways that machines simply cannot understand but pose no problem for fellow humans to sort out. When a teacher says to a student, "Make sure you tell everyone who is absent today about the homework assignment," the meaning of the statement depends on context in a number of ways. First, there is a requirement that the student know what the homework assignment is. If the student does not know the assignment, the statement includes an unstated command to find out that information. The same holds true for the identities of everyone absent from class that day—if that information is not known, it must be determined. Once those two subsidiary queries are satisfied, the resultant information is not communicated back to the teacher, as would be the case with a conventional query, but rather the results of the first query (the homework assignment) is forwarded to the persons who were absent from class that day (results of the second query) by constructing and issuing additional commands.

Natural language statements such as the one set out above present no problems of understanding to a human listener. A conventional computer system, on the other hand, even a system capable of dealing with natural language inputs, would not be able to process that statement or others like it. Thus, the art stands in need of a method for handling natural language inputs that combine communication and queries.

SUMMARY

An aspect of the present disclosure is a method for processing a natural language input to a computerized system. The method begins by parsing the input to identify a query portion and a communication portion of the input. The system then determines an answer to the query portion, including identifying communication parameters from the communication portion. Upon determining the answer, the system prepares an answer to the communication and transmits that answer.

Another aspect of the present disclosure analyzes whether the query portion requires information from a source remote from the system. Upon concluding that the query portion does require information from a remote source, a communication channel is opened from the source to a remote source where the query will be researched. For that purpose, the system creates a subsidiary query to obtain the information required and then submits the subsidiary query to the remote source. The system then receives an answer to the subsidiary query from the remote source. That information is used to compose the answer to the query from the answer to the subsidiary query. If the system concludes that the query portion does not require information from a remote source, the query is analyzed and answered locally.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

DEFINITIONS

The term "natural language understanding computer system" broadly includes computer systems that accept spoken inputs from users, where those inputs are structured in normal spoken language, and are capable of responding to such inputs in an appropriately intelligent way. Here, "computer system" should be understood in its broadest context, including large server-based systems, desktop systems, and mobile systems of all types. The term "query" indicates an input to a computer system from a user asking for information in response to the input. The term "command" in the context of a computer system indicates an input designed to cause the computer system to perform an action, rather than return information. The term "destination," in the context of the recipient of a communication, should also be understood broadly, indicating a single recipient, multiple recipients, or predetermined list of recipients ("distribution lists"). In general, a recipient may be any person or device capable of receiving or configured to receive, an electronic transmission. Examples of recipients are both a person and that person's voice mailbox, or any storage or communication device capable of storing audio and the attached meta-data. Those skilled in the art will understand that the definitions set out above do not limit the scope of the disclosure.

Overview

Broadly, the present disclosure relates to systems and methods for combining a query and a communication command as a single input in a computers system capable of processing natural language inputs. Generally, the system parses the input to separate the query from the communication command. The query is then processed to determine the answer. The communication command is processed to identify and prepare any required communication parameters, and the answer is then incorporated into the required communication format. The answer is then transmitted to the required one or more destinations.

Exemplary Embodiments

Figure 1:
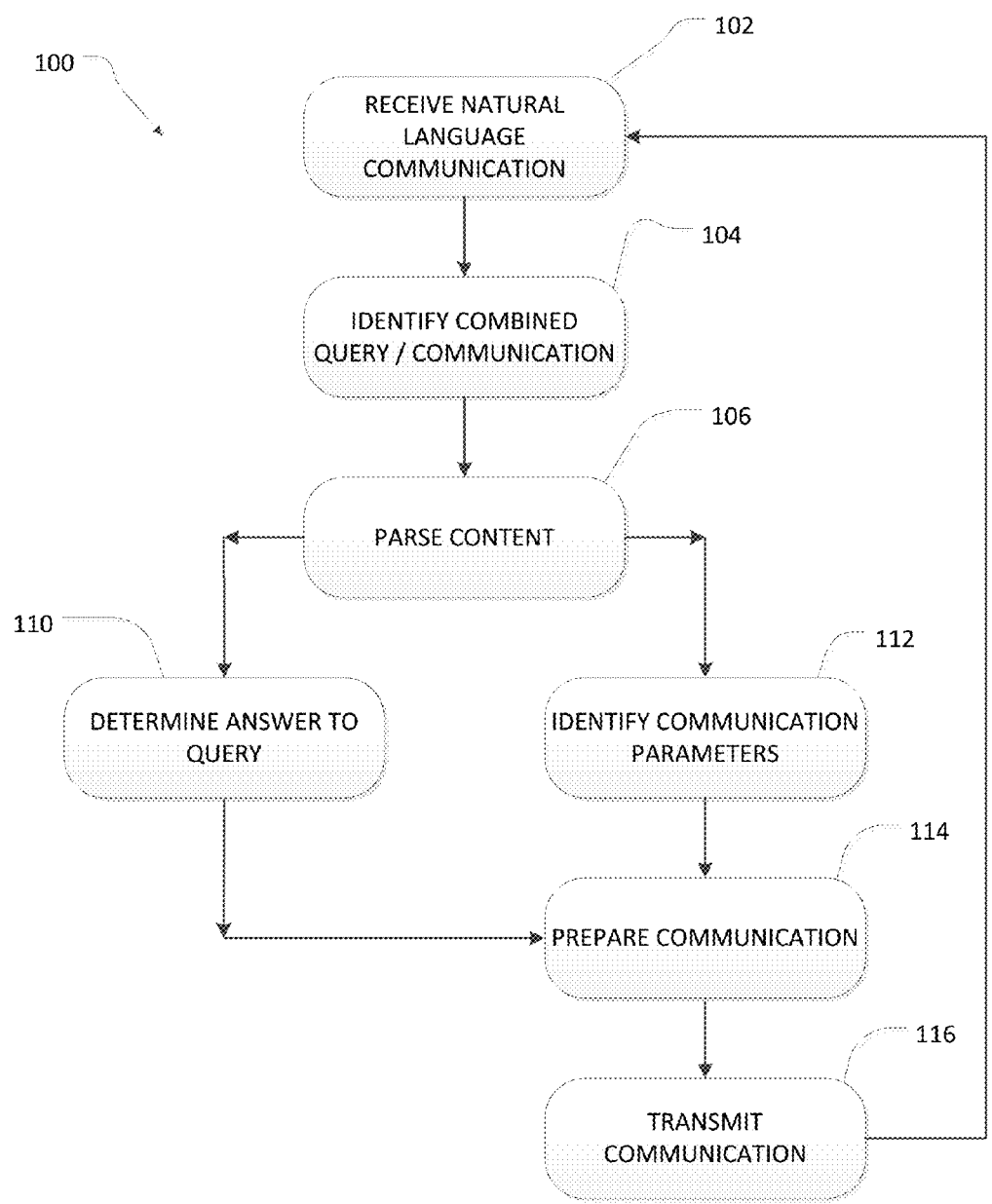
FIG. 1 is a flowchart illustrating an exemplary embodiment of a method for combining a query in a communication command in a natural language computer system, according to the present disclosure.

FIG. 1 is a block diagram of an embodiment of a method 100 for processing a natural language input that contains both a query and a communication command. The process can be envisioned as three sets of actions. First, the input is received and prepared for further processing. Then processing then occurs, with separate actions aimed at determining an answer to the query and preparing communication parameters for communication. Finally, the required communication channel is employed to transmit the answer to the query to the required destination.

The method 100 begins by receiving a natural language communication. In keeping with the definition set out above, a natural language communication is understood to include human speech, delivered by a suitable means to the computer system at step 102. It can be easily understood that a wide variety of delivery means can be employed to present the human speech to the computer system. Most directly, a human being can speak into a receiving device, such as a microphone, which is directly connected to the computer system. For example, contemporary laptop computers generally include an integral microphone, and a user could speak into that microphone to present natural language input. Alternatively, the natural language input could be delivered from a remote location. For example, a user could speak into a mobile device, such as a smartphone, and that device could forward the natural language input to a host system, resident on a server, for example. The server could work through the method 100, and any response could be directed as required, with an acknowledgment sent to the original user at her smartphone. Alternatively, input could be provided to a computer system from a recording device. In that manner, a user could record notes or other material on a recording device, which could be integral with a mobile device, such as a tablet computer. The recorded material could be input to a more powerful computing device later, and the method of the present disclosure could be employed then. Those of skill in the art will imagine the variety of scenarios that are possible within these parameters.

The computer system then identifies a portion of the natural language input as containing a combined query/communication command. It should be noted that traditional keyword-based speech recognition systems may operate by separately performing the operations of identifying specific keywords, then parsing the rest of the utterance accordingly, while more sophisticated systems may combine those operations. Either approach may be taken in implementing the present disclosure. A more sophisticated system for parsing and interpretation would combine recognition of the need for analysis with the analysis itself (steps 104 and 106). Such a system is disclosed in U.S. patent application Ser. No. 13/842,735, entitled "An Integrated Programming Framework for Speech and Text Understanding with Meaning Parsing," filed Mar. 15, 2013, which application is hereby incorporated into the present application in its entirety, for all purposes. In other embodiments, the operations of recognizing the need for analysis and perform the analysis proceed separately. In such a system, recognition takes place at step 104 during the normal course of analyzing the input to identify specific types of content. For example, natural language input is continually analyzed to determine whether a given portion of the input requires further action by the system. Typically, the system will be scanning to determine whether the input contains either a query or a command.

Keyword-based systems recognize commands from the use of particular trigger words, and the system executes a particular command when encountering such keywords, without regard to any semantic analysis. Thus, if such a system encounters the word "stop", it will respond by ceasing work, even when that word occurs in the phrase "keep going until you reach the stop sign." A simplified embodiment of the present disclosure could indicate the presence of a combined query/communication by the use of a keyword or similar identifier. In such systems, the user could say, for example, "query communication" or a similar word or phrase. The system could recognize the keyword as satisfying the requirements of step 104. Such measures can be employed, but they do not achieve the full effectiveness of the present disclosure. Rather, the present disclosure aims at allowing a user simply to speak naturally. That requirement presents the necessity for a sophisticated processing system, but it allows a user to proceed based upon nothing more than good speech habits.

Having identified the presence of a combined query/communication command, step 106 separates the two portions of that combination by parsing the language content. Here, such parsing requires that the system identify and separate the query portion of the input from the communication command portion. A number of semantic analysis techniques can be employed to accomplish this end, and such techniques are known to those of skill in the art.

After parsing the content of the input, processing splits into two paths, which proceed independently and in parallel. At step 110, the system determines the answer to the query contained in the natural language input. The actions involved in that step are set out in some detail in connection with FIG. 2. Simultaneously, at step 112, the system identifies the required communication parameters. Required communication parameters will depend upon a particular situation, including the identification of the device being employed. Some parameters will be inherent to the device itself, and that information can be retrieved from system storage. Other information can be contained within the input, with the possibility of employing a default parameter in the absence of direct input.

An important parameter to be identified from the input is the destination of the required communication. If the input includes, "Tell Natalie the current exchange rate of the euro," the system can immediately identify that the intended recipient is "Natalie". The information required to reach the intended recipient can then be determined by looking at the speaker's contact list, combined with a log of recent calls. From that information, the system can infer that the speaker is referring to his wife, for example. If the system does not find enough information to establish the recipient's identity with a fair degree of confidence, it can ask the speaker for additional input. Alternatively, the system can be configured to include keywords for frequent communication recipients. Using that feature, a user can quickly adding nicknames to already identified contact listings, so that the vast majority of intended recipients are identified by the system using the same nickname as the user employs in ordinary conversation.

Another required communication parameter is the communication channel. In this instance, some semantic analysis may be required to identify the proper channel. For example, the input set out above contains the verb "tell". A computer device cannot literally tell a person something, but it can determine a preferred channel for such a person. Here, a user could have a preset preference, so that system memory includes a setting directing that communications to the user's spouse should be sent via voice, while another setting could indicate that messages to children be sent via SMS or by a particular text messaging system. After the system has been in use for a period of time, the system can associate particular natural language phrases with identified communication channels. For example, the system could store previously identified combination of verbs associated with particular recipients, so that it would interpret "tell Natalie" as "send a voice message via telephone to my wife Natalie."

Other combinations of recipient and communications channel can be directly derived from the input, preset, or inferred from past behavior. Communication channels can be chosen from among available systems, such as email, SMS, voice communication, and the like. Recipients can be identified as individuals, distribution lists, or positions. All of these can be determined by the system by quick investigation of a contact list, such as the contact list maintained by a particular communication system, such as Outlook email, or a list maintained on a particular device, such as the contact list maintained by a particular iPhone. Specialized contact lists can be accessed by importing them. One may import a company contact list, by using a special import routine, for example. These and other specialized communication parameters may be set up by the user. Over time, the system can develop enough information so that it can infer communication parameters by consulting past user behavior.

Similarly, communication channels can be selected from those available at the time this application is filed, or from among communication channels developed hereafter. Such channels can be identified generically, so that when a user says, "email Frank Overton," the system understands that it should use the default email provider available to the system. As with recipients, the system can gain experience over time. The system can employ such an experience base to understand that a user command, "send a text message to . . . " signifies the user's intent to communicate using a specialized text message service, such as the Face-Time messaging system available on Apple devices, or the Skype SMS system. Other systems will undoubtedly be added hereafter, either in conventional computing devices or newly introduced devices such as such as Google Glass.

Once the system has determine an answer to the user's query and has identified all the required communication parameters, the system can proceed to prepare the resulting information for communication, at step 114. There, the system begins by preparing the fixed information required for a message, such as the message header and the like, requiring employment of the identifying communication parameters. To that shell, the system adds body information obtained from the query. In the simple message set out above, incorporating the query about the current exchange rate of the euro, the system may determine that the euro has been trending upward over the last week, having gained $0.03, and that the exchange rate increase by another penny in the day's trading. Thus, the system could construct the message along the lines of, "Euro continues upward trend, currently trading at $1.42." Finally, at step 116, the system transmits the required communication, employing the desired communication method. For oral messages, the system could be configured to construct messages using stock phrases compiled by the user. In that instance, the system could have a number of prepared phrases, such as "continues upward trend," "currently trading at," and the like already recorded, and the system could pick and choose from among these phrases to construct a suitable message. Text messages and the like would be somewhat easier to construct, but the system could similarly flesh out the user command by building a message based upon typical salutation, heading, and closing, gleaned from previous messages.

Figure 2:
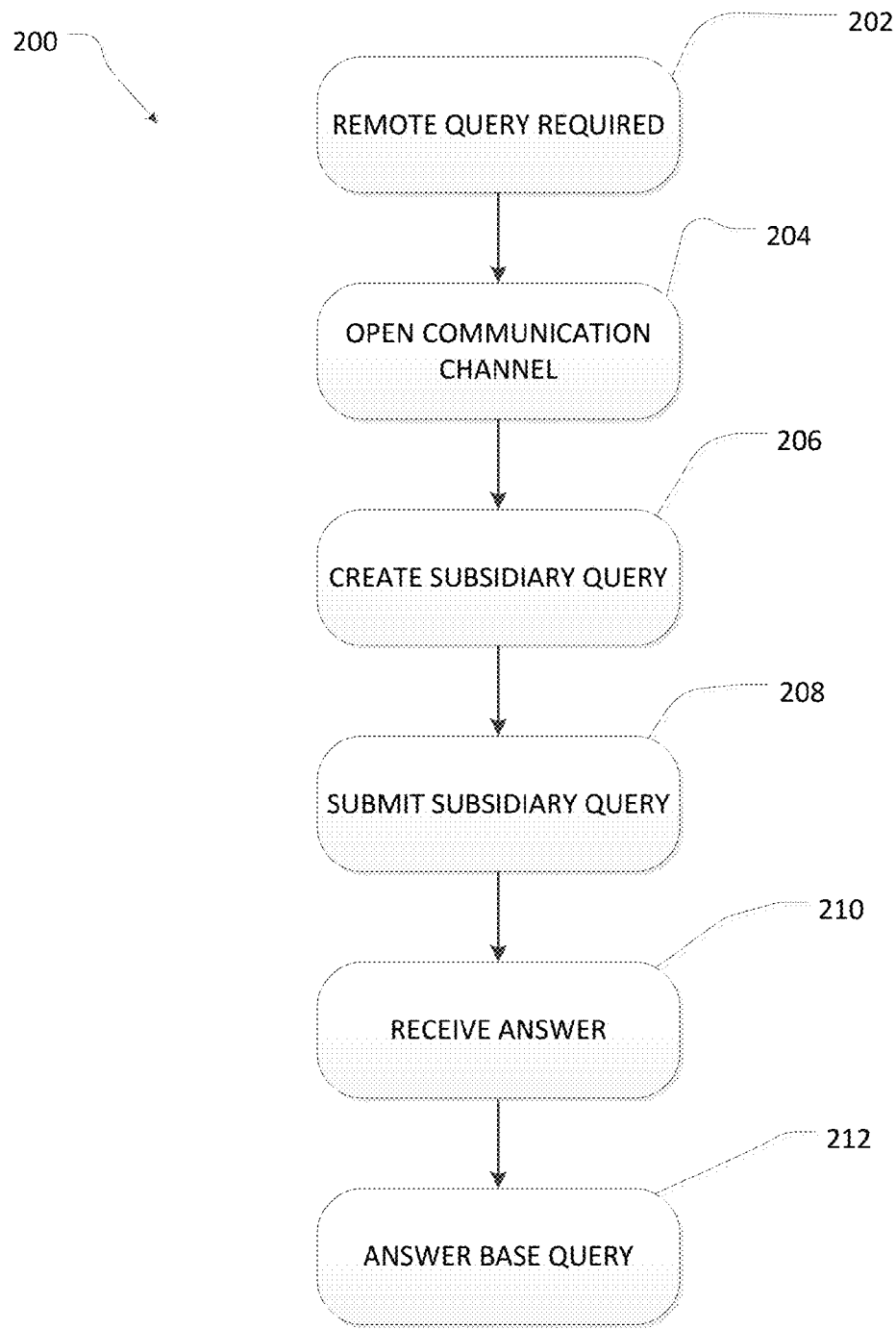
FIG. 2 is a flowchart illustrating a detailed process within the method of FIG. 1.

FIG. 2 details the method 200 involved in determining an answer to the user query, set out at step 110 in FIG. 1. This method begins by determining whether a remote query is actually required, at step 202. The question here is whether the information sufficient to answer the user's query is available at the local device, eliminating the need for any communication. That analysis requires examination of the data available on the local system, in relation to the types of queries that can be answered there. A number of ways to solve this problem are available to those in the art, such as building a database or lookup table identifying topics that can be addressed locally. If required information is not available locally, the system will need to determine where the information can be located. Typically, a single device will be available to address such queries, and most often that device will be based in a server accessible to the user's device. One such one capability of the server can be to forward queries to more appropriate solution locations, as well as to receive answers and forward them to the user. The structure and employment of such systems are known to those in the art and will not be addressed further here. For present purposes, it suffices to say that the system begins by opening a communication channel to the location where the query can be handled, at step 204.

Then, at step 206, system generates a subsidiary query. That query is formatted as required by the query handler, which may be different from the form in which the query is received by the system. As noted above, natural language queries tend to be somewhat elliptical in construction, and they can contain implied or assumed facts. The query handler cannot handle queries in that format, and thus implied information must be inserted into the query structure.

The subsidiary query is then submitted to the query handler, in step 208. This step employs the open communication channel established at step 204. This portion of the operation proceeds exactly as if the system had been directed to find out the particular information involved. Thus, no further explanation of this step is required.

Upon receiving an answer to the query, at step 210, the system proceeds to structure a response to the user's original query, at step 212. Once the answer is formulated, that information is combined with the communication parameters, in step 114 (FIG. 1).

The specification has described a method and system for providing real-time assistance to a traveler. Those of skill in the art will perceive a number of variations possible with the system and method set out above. These and other variations are possible within the scope of the claimed invention, which scope is defined solely by the claims set out below.

We claim:

1. A method for processing a natural language input received from a user of a computerized system, comprising
parsing the input into a query portion and a communication portion, the query portion requesting an answer that is determined without using user-specific information, and the communication portion identifying a destination to which the answer will be communicated;
determining the answer to the query portion without using user-specific information;
identifying communication parameters for the destination identified in the communication portion;
preparing the answer for communication; and
transmitting the answer to the destination identified.

2. The method of claim 1, wherein the parsing and determining occur in combination.

3. The method of claim 1, wherein the communication parameters include at least one destination, where a destination may be
a contact;
an email address;
a mobile phone number for SMS;
a phone number for a text-to-speech voice message;
a computer socket; or
a distribution list.

4. The method of claim 1, wherein the communication parameters include at least one communication channel, where a communication channel may be
email;
SMS;
instant messaging;
a proprietary message service;
telephone service; or
facsimile.

5. The method of claim 1, further comprising:
analyzing whether the query portion requires information from a source remote from the system;
upon concluding that the query portion does require information from a remote source,
opening a communication channel to the remote source;
creating a subsidiary query to obtain the information required;
submitting the subsidiary query to the remote source;
receiving an answer to the subsidiary query from the remote source; and
composing the answer to the query from the answer to the subsidiary query;
upon concluding that the query portion does not require information from a remote source, analyzing and answering the query locally.

6. The method of claim 1, wherein identifying communication parameters includes
identifying communication parameters expressly set out in the communication portion;
supplying communication parameters not set out in the communication portion from preset preferences; and
providing an alert upon determining that a required communication parameter is neither expressly set out in the communication portion nor contained in preset preferences.

7. A non-transitory computer-readable storage medium storing instructions for processing a natural language input received from a user of a computerized system, the instructions which when executed by one or more processors, cause the one or more processors to:
parse the input into a query portion and a communication portion, the query portion requesting an answer that is determined without using user-specific information, and the communication portion identifying a destination to which the answer will be communicated;
determine the answer to the query portion without using user-specific information;
identify communication parameters for the destination identified in the communication portion;
prepare the answer for communication; and
transmit the answer to the destination identified.

8. The non-transitory computer-readable storage medium of claim 7, wherein the communication parameters include at least one destination, where a destination may be
a contact;
an email address;
a mobile phone number for SMS;
a phone number for a text-to-speech voice message;
a computer socket; or
a distribution list.

9. The non-transitory computer-readable storage medium of claim 7, wherein the communication parameters include at least one communication channel, where a communication channel may be
email;
SMS;
instant messaging;
a proprietary message service;
telephone service; or
facsimile.

10. The non-transitory computer-readable storage medium of claim 7, further including instructions that cause the processor to:
analyze whether the query portion requires information from a source remote from the system;
upon concluding that the query portion does require information from a remote source,
open a communication channel to the remote source;
create a subsidiary query to obtain the information required;
submit the subsidiary query to the remote source;
receive an answer to the subsidiary query from the remote source;
compose the answer to the query from the answer to the subsidiary query; and
upon concluding that the query portion does not require information from a remote source, analyze and answer the query locally.

11. The non-transitory computer-readable storage medium of claim 7, wherein the instructions that identify communication parameters further includes instructions that cause the processor to:
identify communication parameters expressly set out in the communication portion;
supply communication parameters not set out in the communication portion from preset preferences; and provide an alert upon determining that a required communication parameter is neither expressly set out in the communication portion nor contained in preset preferences.

12. A system for processing a natural language input, comprising:
- a processor coupled to a memory storing instructions;
- the processor configured to retrieve and execute instructions from the memory, causing the processor to:
  - parse the input into a query portion and a communication portion, the query portion requesting an answer that is determined without using user-specific information, and the communication portion identifying a destination to which the answer will be communicated;
  - determine the answer to the query portion without using user-specific information;
  - identify communication parameters for the destination identified in the communication portion;
  - prepare the answer for communication; and
  - transmit the answer to the destination identified.

13. The system of claim 12, wherein the communication parameters include at least one destination, where a destination may be
- a contact;
- an email address;
- a mobile phone number for SMS;
- a phone number for a text-to-speech voice message;
- a computer socket; or
- a distribution list.

14. The system of claim 12, wherein the communication parameters include at least one communication channel, where a communication channel may be
- email;
- SMS;
- instant messaging;
- a proprietary message service;
- telephone service; or
- facsimile.

15. The system of claim 12, further including instructions that cause the processor to:
- analyze whether the query portion requires information from a source remote from the system;
- upon concluding that the query portion does require information from a remote source,
  - open a communication channel to the remote source;
  - create a subsidiary query to obtain the information required;
  - submit the subsidiary query to the remote source;
  - receive an answer to the subsidiary query from the remote source;
  - compose the answer to the query from the answer to the subsidiary query; and
- upon concluding that the query portion does not require information from a remote source, analyze and answer the query locally.

16. The system of claim 12, wherein the instructions that cause the processor to identify communication parameters further includes instructions that cause the processor to:
- identify communication parameters expressly set out in the communication portion;
- supply communication parameters not set out in the communication portion from preset preferences; and
- provide an alert upon determining that a required communication parameter is neither expressly set out in the communication portion nor contained in preset preferences.

* * * * *